Nov. 23, 1937. A. F. GRODHAUS 2,099,848
FLEXIBLE COUPLING FOR POWER DRIVE
Filed Aug. 17, 1935 2 Sheets-Sheet 1

Adolph F. Grodhaus Inventor
By P. L. Young Attorney

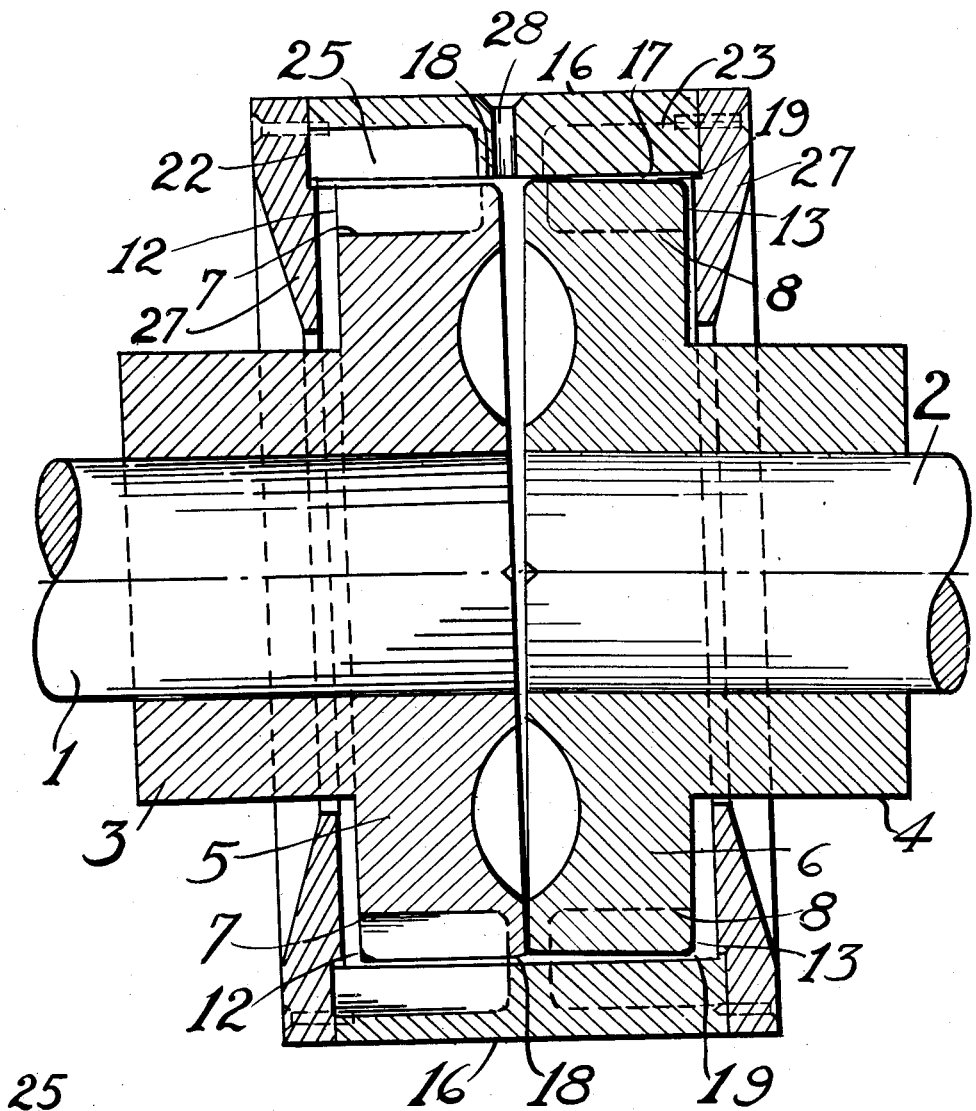
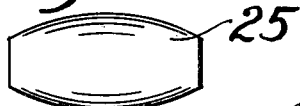
Fig. 3
Fig. 4
Fig. 5
Adolph F. Grodhaus Inventor
By P. L. Young Attorney

UNITED STATES PATENT OFFICE 2,099,848

FLEXIBLE COUPLING FOR POWER DRIVE

Adolph F. Grodhaus, Baytown, Tex.

Application August 17, 1935, Serial No. 36,642

1 Claim. (Cl. 64—9)

This invention relates to improvement in shaft coupling. More particularly it relates to an improved coupling providing for lateral misalignment of the shafts.

It is an object of this invention to provide for the smooth operation of a coupling for two shafts transmitting power operably under conditions where it is difficult to maintain perfect alignment or where there is a tendency at high speeds to develop misalignment or bending moment.

Other objects will be apparent from the specification and from the accompanying drawings, in which latter—

Fig. 3 is a side elevational view of a bearing member of elliptical shape;

Fig. 4 is a side elevational view of the barrel shaped bearing member, and

Fig. 5 is a longitudinal sectional view through the shaft coupling while in misalignment.

Figure 2:
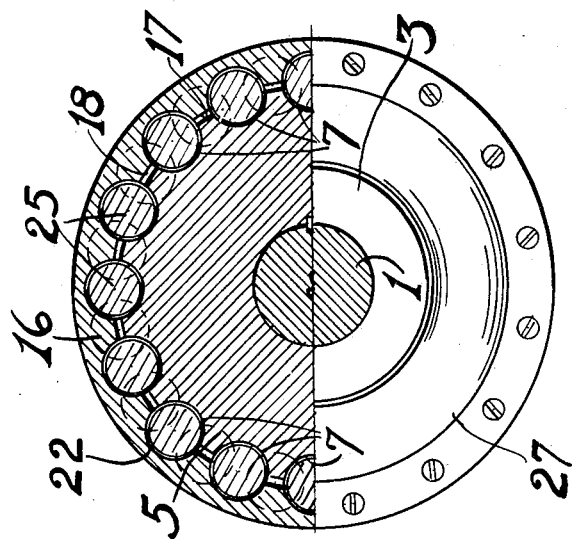
Fig. 2 is a transverse sectional view partly in end elevation looking along the line II—II of Fig. 1.
Figure 1:
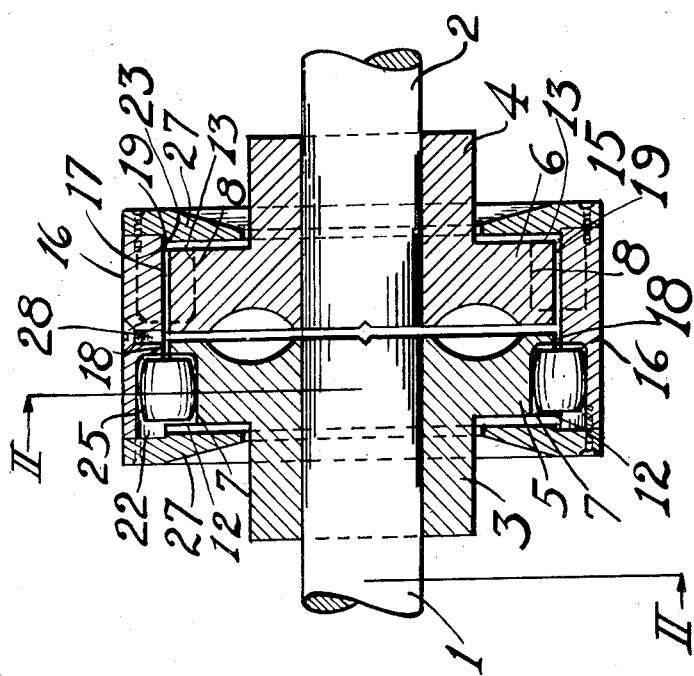
Fig. 1 is a longitudinal sectional view through the shaft coupling.

Referring particularly to the drawings, reference numerals 1 and 2 designate shafts the adjoining ends of which can be operated in lateral misalignment. The shafts 1 and 2 carry hubs 3 and 4 respectively which are rigidly secured to the shafts. The adjoining ends of the hubs 3 and 4 are provided with outwardly protruding shoulders 5 and 6 respectively. The shoulders 5 and 6 are provided with a plurality of grooves 7 and 8 spaced peripherally around the hubs. The grooves 7 and 8 extend longitudinally of the shoulders 5 and 6 and are closed at the adjoining ends of the shoulders 5 and 6. The grooves 7 and 8 open through the side walls 12 and 13 of the shoulders 5 and 6 respectively.

An annular sleeve 16 encircles the shoulders 5 and 6 of the hubs and its inner surface 17 is of substantially larger diameter than the diameters of the external surfaces of the shoulders 5 and 6 forming spaces designated 18 and 19 between the hubs and the sleeve 16. The sleeve 16 is provided with a plurality of series of spaced grooves 22 and 23 upon its inner surface 17 separated by an annular rib 17' of lesser length than the thickness of the bearings 25 to be later described. The grooves 22 and 23 of each series are spaced from each other peripherally, as can be clearly seen in Fig. 2. The grooves 22 and 23 of the series are aligned respectively with the grooves 7 and 8 of the adjoining hubs to form a plurality of pockets adapted to receive bearings 25. Annular rings 27 are secured to opposite ends of the sleeve 16 and protrude radially inwardly around the shoulders 5 and 6 of the hubs to function as grease retaining plates. These retaining plates prevent lateral displacement of the sleeve 16 and function to shield the mechanism from infiltration of dirt and grit. Grease is injected into the coupling through a grease connection 28 in the sleeve 16 and flows into a grease reservoir formed by recess 29 in the adjoining ends of the hubs.

The bearings or load transmitters 25 are barrel shaped and disposed longitudinally in the pockets. The bearings or load transmitters 25 are designed to offer a bearing surface for engagement with the walls of the pockets. It will be understood that for small loads ball shaped bearings may be used instead of the barrel shaped load transmitters and some of the advantages of the invention will be retained. Barrel shaped bearings provide a broad bearing surface and therefore will not break the walls of the grooves 7, 8, 22 and 23 under high driving strain. In the embodiment illustrated, 16 bearings are used for each hub. The number of bearings is varied with the amount of load for which the coupling is designed. A minimum of 12 bearings is used for each hub. The use of a large number of bearings eliminates vibration of the coupling members. The use of a large number of bearings placed closely together permits of a high-speed coupling which can be used for driving heavy loads without chattering of the parts due to looseness of engagement of the sleeve 16 around the hubs. In operation, the bearing members 25 are thrown out radially due to centrifugal force and with the construction described a smooth rather than a chattering action is obtained. The barrel shaped bearings 25 offer a large bearing surface at any angle of the shafts and therefore exert a minimum of pressure upon the edges of the grooves. By reason of this large bearing surface it is possible to have a large amount of contact points between the bearing members and the pockets to withstand the load when the coupling is used for driving heavy loads. The coupling is operative for driving loads up to as high as 10,000 H. P. or higher.

The bearings are of substantially smaller external diameter than the internal diameter of the pockets. In the embodiment illustrated, a clearance of $\frac{1}{16}$ of an inch is obtained between the bearings 25 and the pockets in which they are disposed. This clearance can be greater if desired. This clearance results in giving to the coupling a flexibility and a capacity for functioning even though there is misalignment of the shafts 1 and 2. The lateral misalignment of the shafts 1 and 2 may be as great as 1/16 of an inch or greater also and relative angular movement of the shafts is obtained up to approximately 9°.

Power is transmitted through the coupling by means of the setting and interlocking of the load transmitters 25 on the complementary parts of the coupling. Satisfactory service of the load bearings or load transmitters is assured by a liberal supply of grease. This grease is forced between the bearings and their pocket settings by centrifugal force developed during the rotation of the coupling. In this manner there is obtained minimum surface wear of both the load transmitters and the walls of the pockets. The coupling is simple to assemble and is readily repaired since there are no intricate or difficultly accessible parts.

An alternative form of bearing 25 is illustrated in Fig. 3, which is of elliptical shape. The bearings, whether barrel shaped or elliptical shaped, resemble elliptical rollers and are machined to permit, when fitted into the pockets, a bending effect of the shafts 1 and 2 up to approximately 20°, and to give a driving effect in this position equal to that obtainable when the shafts are in perfect alignment and are not flexed or bent in any way. The grooves 7, 8, 22 and 23 may vary in depth and are cut according to the extent of the lateral motion desired to be transmitted by the bearings. The hub members and sleeve are made as large in diameter as construction and machining permit.

The construction described is of advantage in that it is possible to have lateral misalignment of the shafts as great as 1/16 of an inch or greater and consequently one shaft can be lower or higher than the other. Also, the coupling is operable up to and above 10,000 H. P. The large number of pockets and the use of bearing members of lesser diameter than the pockets permits of a rocking movement of the sleeve 16.

Various changes and alternate arrangements may be made within the scope of the appended claim in which it is my intention to claim all novelty inherent in the art as broadly as the prior art permits.

I claim:

A coupling comprising hubs respectively attached to the opposed ends of two shafts, each hub having a plurality of grooves spaced peripherally around an annular shoulder on said hub, a one piece annular sleeve encircling the hub shoulders, and having an internal diameter greater than the external diameters of the hub shoulders, a series of spaced grooves upon the inner surface of one end of said sleeve and extending inwardly to a point adjacent the center of the sleeve body, a series of identical grooves upon the inner surface of the other end of the sleeve disposed in staggered and overlapping relation to said first series, whereby an annular rib is formed, midway of the inner surface of the sleeve, and a plurality of staggered ribs extending longitudinally therefrom toward the ends of the sleeve, the grooves of each hub, when aligned with the grooves in the sleeve, forming a plurality of pockets in staggered and overlapping opposition, bearings of smaller diameter than the pockets disposed therein for driving engagement with the walls of the pockets and permitting lateral misalignment of the shafts, the annular rib being of lesser length than the thickness of the bearings.

ADOLPH F. GRODHAUS.